(12) United States Patent
Yamaji et al.

(10) Patent No.: US 6,712,400 B1
(45) Date of Patent: Mar. 30, 2004

(54) COUPLING MEMBER FOR USE IN FLUID CONTROL APPARATUS AND METHOD OF FABRICATING SAME

(75) Inventors: Michio Yamaji, Osaka (JP); Osamu Fukata, Osaka (JP); Kosuke Yokoyama, Osaka (JP); Tadanobu Yoshida, Osaka (JP); Hiroshi Morokoshi, Osaka (JP)

(73) Assignee: Fujikin Incorporated, Osaka (JP)

( * ) Notice: Subject to any disclaimer, the term of this patent is extended or adjusted under 35 U.S.C. 154(b) by 0 days.

(21) Appl. No.: 09/437,294

(22) Filed: Nov. 9, 1999

(30) Foreign Application Priority Data

Nov. 11, 1998 (JP) .......................... 10-320746

(51) Int. Cl.⁷ ................................ F16L 45/00
(52) U.S. Cl. .................. 285/284.1; 29/423; 285/134.1
(58) Field of Search ................. 29/423, 445; 285/125.1, 285/134.1, 133.11, 132.1, 284.1, 122.1

(56) References Cited

U.S. PATENT DOCUMENTS

| | | | | |
|---|---|---|---|---|
| 1,647,321 A | * | 11/1927 | Thurstensen | ............. 138/95 |
| 3,890,508 A | | 6/1975 | Sharp | |
| 3,934,605 A | * | 1/1976 | Legris | ............. 137/271 |
| 4,393,565 A | * | 7/1983 | Wilson et al. | ............. 29/423 |
| 4,740,018 A | * | 4/1988 | Kenmochi | ............. 285/125.1 |
| 4,917,535 A | * | 4/1990 | Prassas | ............. 285/125.1 |
| 5,058,214 A | * | 10/1991 | Shinn | ............. 285/134.1 |
| 5,230,741 A | | 7/1993 | van de Ven et al. | |
| 5,806,897 A | * | 9/1998 | Nagai et al. | ............. 285/125.1 |
| 5,819,782 A | | 10/1998 | Itafuji | |
| 6,161,875 A | * | 12/2000 | Yamaji et al. | ............. 285/124.1 |

FOREIGN PATENT DOCUMENTS

DE    196 02 464 A1    7/1997

* cited by examiner

Primary Examiner—Lynne H. Browne
Assistant Examiner—Aaron Dunwoody
(74) Attorney, Agent, or Firm—Armstrong, Kratz, Quintos, Hanson & Brooks, LLP

(57) ABSTRACT

A method for facilitating fabrication of a coupling member includes a first step of boring one of upwardly open, passageways, a communication passageway and an auxiliary passageway in a body block, a second step of inserting a closure member into the auxiliary passageway, a third step of welding the closure member to the inner peripheral body portion defining the auxiliary passageway, and a fourth step of boring the other upwardly open passageway in the body block. The closure member is inserted in the second step so as to be positioned at least party in the portion where the other upwardly open passageway is to be formed.

3 Claims, 3 Drawing Sheets

US 6,712,400 B1

COUPLING MEMBER FOR USE IN FLUID CONTROL APPARATUS AND METHOD OF FABRICATING SAME

BACKGROUND OF THE INVENTION

The present invention relates to coupling members for use in fluid control apparatus included, for example, in semiconductor manufacturing equipment for holding fluid channels in the control apparatus in communication with one another.

The terms "upper," "lower," "left" and "right" as used herein refer respectively to the upper and lower sides, and left- and right-hand sides of FIG. 1. However, these terms are used for the sake of convenience; the apparatus or components to be described can be used as turned upside down or as laid on their side.

It is required in recent years that the fluid control apparatus for use in semiconductor manufacturing equipment be integrated to reduce the space to be occupied by the apparatus. To fulfill this requirement, for example, Japanese Patent Application 278495/1997 proposes a fluid control apparatus shown in FIG. 3.

The proposed fluid control apparatus 101, which is adapted for use in semiconductor manufacturing equipment or the like, comprises a massflow controller 2, an inlet-side on-off-opening assembly 3 provided at the left of the controller 2, and an outlet-side shutoff-opening assembly 4 disposed at the right of the controller 2.

Provided on the left side of lower portion of the massflow controller 2 is a left extension block (first fluid control member) 5 in the form of a rectangular parallelepiped and formed with an inlet channel 5a which has an opening in the bottom surface of the block. Provided on the right side of the controller lower portion is a right extension block (second fluid control member) 6 in the form of a rectangular parallelepiped and formed with an outlet channel 6a which has an opening in the bottom surface of the block. The extension blocks 5, 6 are fastened to the body of the controller 2 with screws driven in laterally.

The inlet-side shutoff-opening assembly 3 comprises third to sixth fluid control members 7, 8, 9, 10 arranged to an upper level. End first to fifth rectangular parallelepipedal couplings 11, 12, 13, 14, 51 arranged to a lower level.

The third fluid control member 7, which is disposed at the left end of the assembly 3, comprises a first on-off valve 17 integral with a body block 16 having an inlet channel 16a and an outlet channel 16b which extend downward, the valve 17 being operable to bring these channels 16a, 16b into an out of communication with each other.

The fourth fluid control member 8, which is the second from the left end of the assembly 3, comprises a body block 18 generally in the form of a rectangular parallelepiped, having a top left portion providing a slope and having an inlet channel 18a and an outlet channel 18b which extend downward; a pressure regulator 19 mounted on the slope of the body 18 and disposed at a portion of communication between the channels 18a, 18b for giving a regulated pressure; and a pressure sensor 20 mounted on a flat portion at the top left part of the body 18 for measuring fluid pressure through a channel communicating with the outlet channel 18b. The inlet channel 18a of the body 18 has a filter 21.

The fifth fluid control member 9, which is the third from the left end of the assembly 3, comprises second and third on-off valves 23, 24 which are mounted on one body block 22 in the form of a rectangular parallelepiped. The body block 22 has a downward first inlet channel 22a formed in its left end, a rightward outlet channel 22b communicating with the channel 22a through the second on-off valve 23, and a downward second inlet channel 22c communicating with the outlet channel 22b through the third on-off valve 24.

The sixth fluid control member 10, which is the fourth from the left end of the assembly 3, comprises a rectangular parallelepipedal channel block. The member 10 is formed with a communication channel 10a having one end communicating with the outlet channel 22b of the fifth fluid control member 22 and the other end which is open downward.

The first coupling 11, which is disposed at the left end of the inlet-side shutoff-opening assembly 3, has an L-shaped upstream communication channel 11a opened leftward and communicating with the inlet channel 16a of the third fluid control member body 16, and an L-shaped downstream communication channel 11b opened rightward and communicating with the outlet channel 16b of the body 16. Provided on the left side of the first coupling 11 is a first inlet pipe joint 25 communicating with the upstream communication channel 11a.

The second coupling 12, which is the second from the left end of the assembly 3, has an L-shaped upstream communication channel 12a for holding the outlet channel 11b of the first coupling 11 in communication with the inlet channel 18a of the fourth fluid control member body 18, and an L-shaped downstream communication channel 12b having one end communicating with the outlet channel 18b of the body 18 and the other end opened rightward.

The third coupling 13, which the third from the left end of the assembly 3, has an L-shaped communication channel 13a for holding the outlet channel 12b of the second coupling 12 in communication with the first inlet channel 22a of the fifth fluid control member body 22.

The fourth coupling 14, which is the fourth from the left end of the assembly 3, is formed with a communication channel 14a having one end communicating with the second inlet channel 22c of the fifth fluid control member body 22 and the other end opened rearward. Disposed on the rear side of the fourth coupling 14 is a second inlet pipe joint (not shown) communicating with the channel 14a.

The fifth coupling 51, which is the fifth from the left end of the assembly 3, is formed with a U-shaped communication channel 51a and comprises first and second rectangular parallelepipedal coupling forming members 52, 53. The first coupling forming member 52 is provided with an L-shaped upstream communication channel 52a having one end communicating with the outlet of communication channel 10a of the sixth fluid control member 10 and the other end which is open rightward. The second coupling forming member 53 is provided with an L-shaped downstream communication channel 53a having one end in communication with the channel 52a of the first coupling forming member 52 and the other end in communication with the inlet channel 5a of left extension block 5 of the massflow controller 2. The first and second coupling forming members 52, 53 are fitted to each other with a seal 33 interposed therebetween so as to hold the upstream channel 52a in communication with the downstream channel 53a, whereby the above-mentioned U-shaped communication channel 51a is formed in the fifth coupling 51 for holding the communication channel 10a of the sixth control member 10 in communication with the inlet channel 5a of left extension 5 of the massflow controller 2.

The outlet-side shutoff-opening assembly 4 comprises a seventh fluid control member 26 disposed at an upper level, and sixth and seventh rectangular parallelepipedal couplings 54, 28 which are arranged at a lower level. The seventh fluid control member 26 comprises a fourth on-off valve 30 integral with a body block 29 having an inlet channel 29a and an outlet channel 29b, which extend downward, the valve 30 being operable to bring these channels 29a, 29b into and out of communication with each other. The sixth coupling 54 disposed at the left side of the assembly 4 is formed with a U-shaped communication channel 54a and comprises first and second rectangular parallelepipedal coupling forming members 55, 56. The first coupling forming member 55 is provided with an L-shaped upstream communication channel 55a having one end communicating with the outlet channel 6a of right extension block 6 of the massflow controller 2 and the other end which is open rightward. The second coupling forming member 56 is provided with an L-shaped downstream communication channel 56a having one end communicating with the downstream channel 55a of the first coupling forming member 55 and the other end in communication with the inlet channel 29a of the seventh fluid control member body 29. The first and second coupling forming members 55, 56 are fitted to each other with a seal 33 interposed therebetween so as to hold the upstream channel 55a in communication with the downstream channel 56a, whereby the above-mentioned U-shaped communication channel 54a is formed in the sixth coupling 54 for holding the outlet channel 6a of right extension 6 of the massflow controller 2 in communication with the inlet channel 29a of the seventh fluid control member body 29. The seventh coupling 28 disposed at the right end of the assembly 4 is formed with a communication channel 28a having one end communicating with the outlet channel 29b of the body 29 and the other end opened rearward. Disposed on the rear side of the seventh coupling 28 is an outlet pipe joint (not shown) communicating with the channel 28a.

The bottom surfaces of the fluid control members 5, 6, 7, 8, 9, 10, 26 are all flush with one another. The upper surfaces of the couplings 11, 12, 13, 14, 51, 54, 28 are also flush with one another. The couplings 11, 12, 13, 14, 51, 54, 28 are fixed to a base plate 31. The fluid control members 5, 6, 7, 8, 9, 10, 26 are fixed to at least one of the couplings 11, 12, 13, 14, 51, 54, 28 with screws 32 from above.

Different fluids are introduced into the fluid control apparatus 1 respectively through the first inlet pipe joint 25 of the first coupling 11 and the second inlet pipe joint of the fourth coupling 14. These fluids as suitably changed over from one to the other are passed through the controller 2 and discharged from the outlet pipe joint of the seventh coupling 28.

With the fluid control apparatus 1, the massflow controller 2 can be taken out upward along with the left and right extension blocks 5, 6. The third to seventh fluid control members 7, 8, 9, 10, 26 can also be removed upward individually. A seal 33 is provided in each of the portions of communication between the fluid control members 5, 6, 7, 8, 9, 10, 26, the portions of communication between the couplings 11, 12, 13, 14, 15 and the portions of communication between the fluid control members 5, 6, 7, 8, 9, 10, 26 and the couplings 11, 12, 13, 14, 51, 54, 28.

The fifth coupling 51 comprises two components 52, 53 formed with respective L-shaped channels 52a, 53a and fitted to each other with a seal 33 provided therebetween so as to obtain a channel which is U-shaped in its entirety. Similarly the sixth coupling 54 comprises two components 55, 56 having respective L-shaped channels 55a, 56a. The fluid control apparatus 1 therefore has the problem to be overcome of having not only an increased number of components, which are cumbersome to assemble, but also an increased number of seals entailing greater likelihood of leakage of fluid and increased maintenance work.

SUMMARY OF THE INVENTION

In view of the foregoing situation, an object of the present invention is to provide a coupling member which permits the fluid control apparatus disclosed in Japanese Patent Application 278495/1997 to retain the advantage thereof and which nevertheless makes it possible to reduce the number of components and the number of seals in producing the fluid control apparatus, and to provide a method of fabricating the coupling member.

The present invention provides a coupling member for use in fluid control apparatus which member comprises a body block formed with a U-sped channel comprising a pair of upwardly open opposite passageways parallel to each other and a communication passageway holding lower ends of the opposite passageways in communication with each other therethrough, and an auxiliary passageway extending from the lower end of one of the opposite passageways as an extension of the communication passageway in alignment therewith, the auxiliary passageway being closed.

The coupling member of the present invention can be substituted for a coupling which comprises two components each having an L-shaped channel and joined end-to-end with a seal provided therebetween, so that the use of the present coupling member reduces the number of components and the number of seals in fabricating fluid control apparatus, consequently making the fluid control apparatus easy to assemble, diminishing the likelihood of fluid leaks and reducing the maintenance work needed.

The present invention also provides a method of fabricating a coupling member for use in fluid control apparatus which is characterized in that the method comprises a first step of boring one of the upwardly open opposite passageways, a communication passageway and an auxiliary passageway in a body block, a second step of inserting a closure member into the auxiliary passageway, a third step of welding the closure member to an inner peripheral portion of the body block defining the auxiliary passageway, and a fourth step of boring the other upwardly open passageway in the body block, the closure member being inserted in the second step so as to be positioned at least partly in the portion where the other upwardly open passageway is to be formed.

The coupling, thus fabricated, is unlikely to permit the fluid to collect in the auxiliary passageway and therefore to give rise to the problem of impaired purity of the process gas when used in semiconductor manufacturing equipment, or the like, which requires a very high degree of cleanliness.

DESCRIPTION OF THE PREFERRED EMBODIMENTS

Embodiments of the invention will be described below with reference to the drawings. In the following description, the front side of the plane of FIG. 1 will be referred to as "front," and the rear side thereof as "rear."

Figure 1:
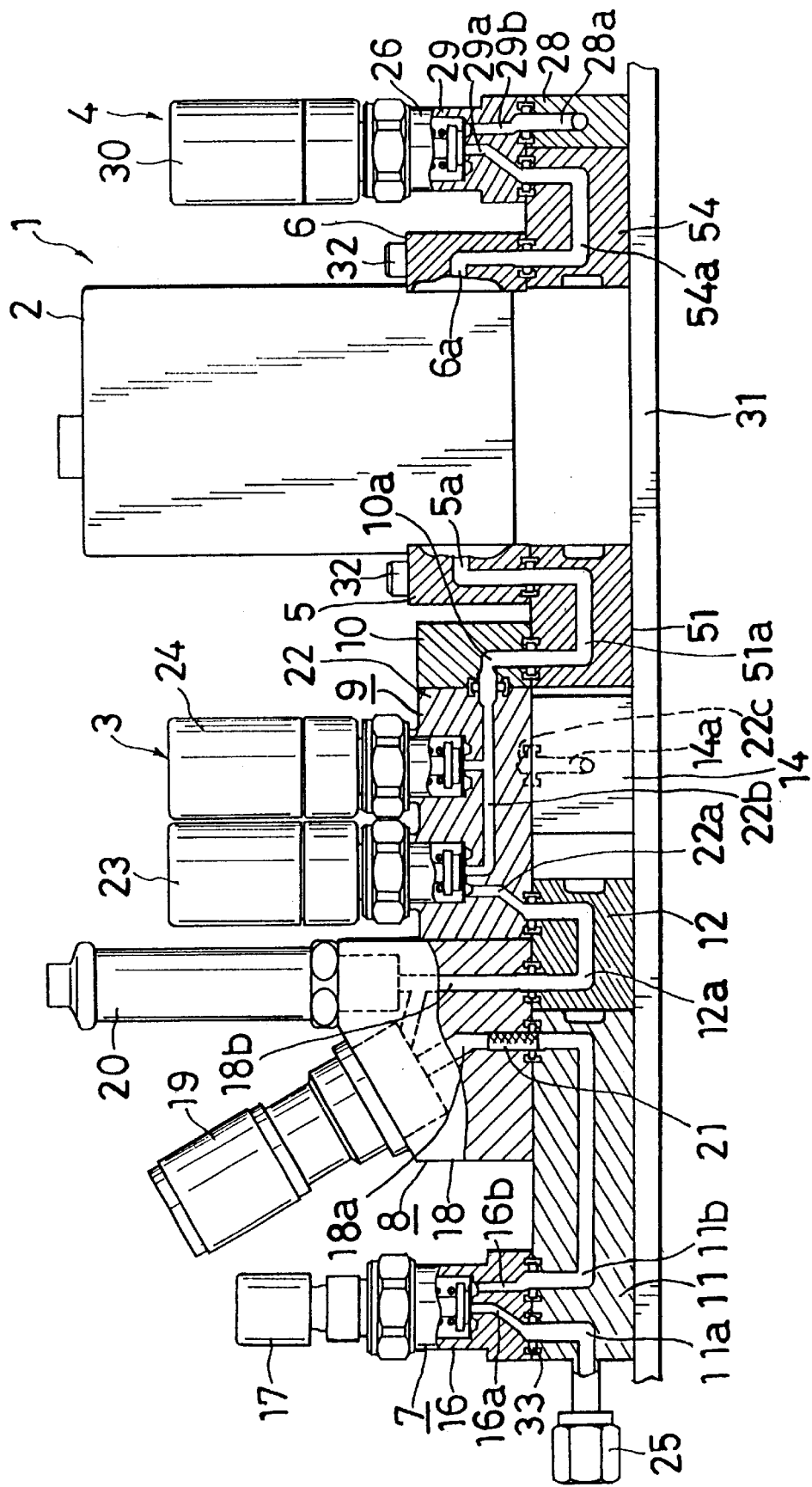
FIG. 1 is a view showing an embodiment of fluid control apparatus incorporating coupling members of the invention.

FIG. 1 shows an embodiment of fluid control apparatus having coupling members of the present invention incorporated therein. The fluid control apparatus 1, which is adapted for use in semiconductor manufacturing equipment or the like, comprises a massflow controller 2, an inlet-side on-off-opening assembly 3 provided at the left of the controller 2, and an outlet-side shutoff-opening assembly 4 disposed at the right of the controller 2.

Provided on the left side of lower portion of the massflow controller 2 is a left extension block (first fluid control member) 5 in the form of a rectangular parallelepiped and formed with an inlet channel 5a which has an opening in the bottom surface of the block. Provided on the right side of the controller lower portion is a right extension block (second fluid control member) 6 in the form of a rectangular parallelepiped and formed with an outlet channel 6a which has an opening in the bottom surface of the block. The extension blocks 5, 6 are fastened to the body of the controller 2 with screws driven in laterally.

The inlet-side shutoff-opening assembly 3 comprises third to sixth fluid control members 7, 8, 9, 10 arranged at an upper level, and first to fourth rectangular parallelepipedal couplings 11, 12, 14, 51 arranged at a lower level.

The third fluid control member 7, which is disposed at the left end of the assembly 3, comprises a first on-off valve 17 integral with a body block 16 having an inlet channel 16a and an outlet channel 16b which extend downward, the valve 17 being operable to bring these channels 16a, 16b into and out of communication with each other.

The fourth fluid control member 8, which is the second from the left end of the assembly 3, comprises a body block 18 generally in the form of a rectangular parallelepiped, having a top left portion providing a slope and having an inlet channel 18a and an outlet channel 18b which extend downward; a pressure regulator 19 mounted on the slope of the body block 18 and disposed at a portion of communication between and the channels 18a, 18b for giving a regulated pressure; and a pressure sensor 20 mounted on a flat portion at the top left part of the body block 18 for measuring fluid pressure through a channel communicating with the outlet channel 18b. The inlet channel 18a of the body block 18 has a filter 21.

The fifth fluid control member 9, which is the third from the left end of the assembly 3, comprises second and third on-off valves 23, 24 which are mounted on one body block 22 in the form of a rectangular parallelepiped. The body block 22 has a downward first inlet channel 22a formed in its left end, a rightward outlet channel 22b communicating with the channel 22a through the second on-off valve 23, and a downward second inlet channel 22c communicating with the outlet channel 22b through the third on-off valve 24.

The sixth fluid control member 10, which is the fourth from the left end of the assembly 3, comprises a rectangular parallelepipedal channel block. The member 10 is formed with a communication channel 10a having one end communicating with the outlet channel 22b of the fifth fluid control member 22 and the other end which is open downward.

The first coupling 11, which is disposed at the left end of the inlet-side shutoff-opening assembly 3, has an L-shaped communication channel 11a opened leftward and communicating with the inlet channel 16a of the third fluid control member body 16, and a U-shaped communication channel 11b for holding the outlet channel 16b of the body 16 in communication with the inlet channel 18a of the fourth fluid control member body 18. Provided on the left side of the first coupling 11 is a first inlet pipe joint 25 communicating with the communication channel 11a.

The second coupling 12, which is the second from the left end of the assembly 3, has a U-shaped communication channel 12a for holding the outlet channel 18b of the fourth fluid control member body 18 in communication with the first inlet channel 22a of the fifth fluid control member body 22.

The third coupling 14, which is the third from the left end of the assembly 3, is formed with a communication channel 14a having one end communicating with the second inlet channel 22c of the fifth fluid control member body 22 and the other end opened rearward. Disposed on the rear side of the third coupling 14 is a second inlet pipe joint (not shown) communicating with the channel 14a.

The fourth coupling 51, which is the fourth from the left end of the assembly 3, is formed with a U-shaped communication channel 51a for holding the communication channel 10a of the sixth fluid control member 10 in communication with the inlet channel 5a of left extension block 5 of the massflow controller 2.

The outlet-side shutoff-opening assembly 4 comprises a seventh fluid control member 26 disposed at an upper level, and fifth and sixth rectangular parallelepipedal couplings 54, 28 which are arranged at a lower level. The seventh fluid control member 26 comprises a fourth on-off valve 30 integral with a body block 29 having an inlet channel 29a and an outlet channel 29b which extend downward, the valve 30 being operable to bring these channels 29a, 29b into and out of communication with each other. The fifth coupling 54 disposed at the left side of the assembly 4 is formed in a U-shaped communication channel 54a for causing the outlet channel 6a of right extension block 6 of the massflow controller 2 to communicate with the inlet channel 29a of the seventh fluid control member body 29. The sixth coupling 28 disposed at the right end of the assembly 4 is formed with a communication channel 28a having one end communicating with the outlet channel 29b of the body 29 and the other end opened rearward. Disposed on the rear side of the sixth coupling 28 is an outlet pipe joint (not shown) communicating with the channel 28a.

The bottom surfaces of the fluid control members 5, 6, 7, 8, 9, 10, 26 are all flush with one another. The upper surfaces of the couplings 11, 12, 14, 51, 54, 28 are also flush with one another. The couplings 11, 12, 14, 51, 54, 28 are fixed to a base plate 31. The fluid control members 5, 6, 7, 8, 9, 10, 26 are fixed to at least one of the couplings 11, 12, 14, 51, 54, 28 with screws 32 from above.

Different fluids are introduced into the fluid control apparatus 1 respectively through the first inlet pipe joint 25 of the first coupling 11 and the second inlet pipe joint of the third coupling 14. These fluids as suitably changed over from one to the other are passed through the controller 2 and discharged from the outlet pipe joint of the sixth coupling 28.

With the fluid control apparatus 1, the massflow controller 2 can be taken out upward along with the left and right extension blocks 5, 6. The third to seventh fluid control members 7, 8, 9, 10, 26 can also be removed upward individually. A seal 33 is provided in each of the portions of communication between the fluid control members 5, 6, 7, 8, 9, 10, 26, and the portions of communication between these fluid control members and the couplings 11, 12, 14, 51, 54, 28.

Figure 3:
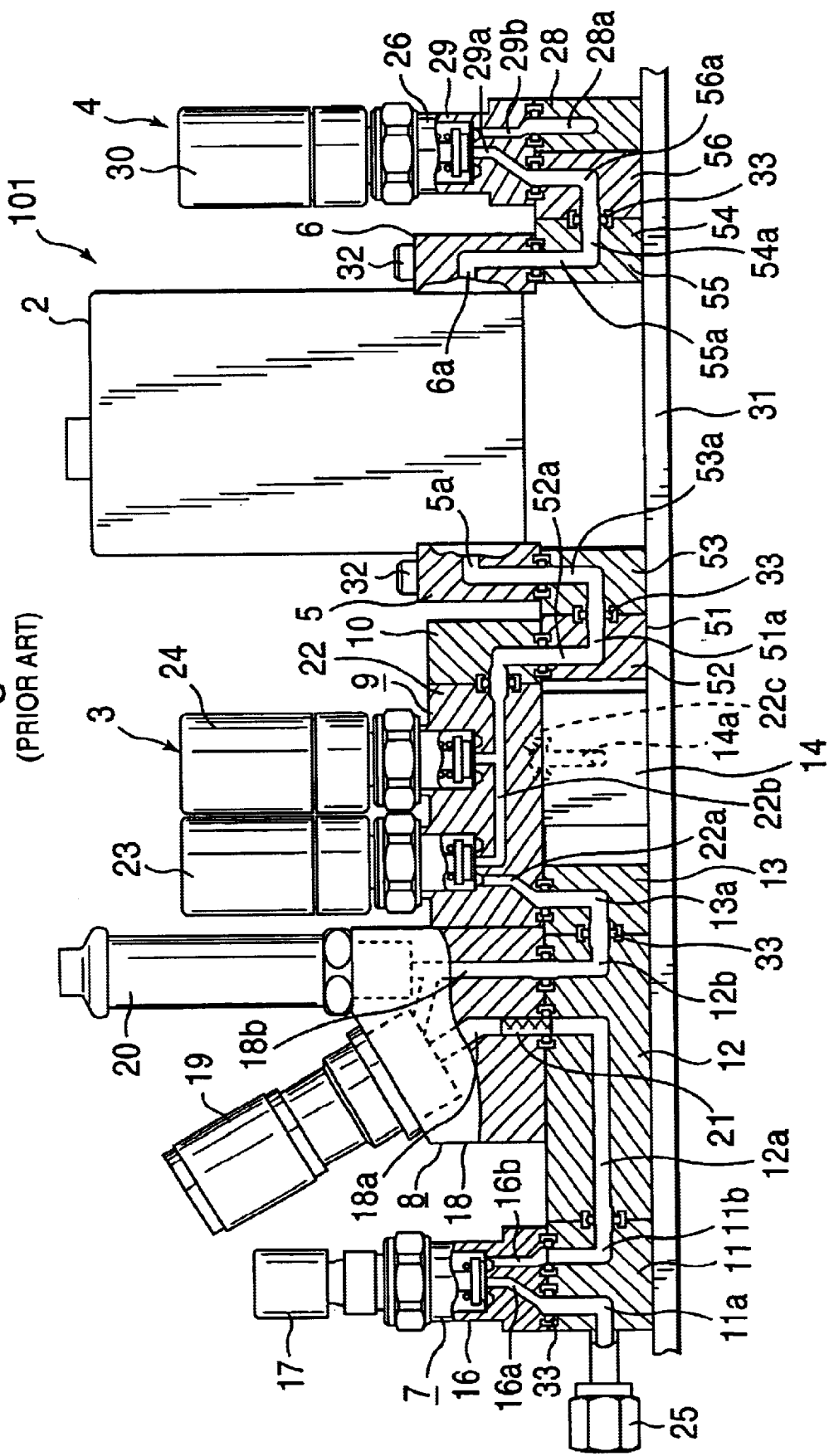
FIG. 3 is a view showing an example of fluid control apparatus wherein conventional coupling members are used.

A comparison between the fluid control apparatus 1 of the invention and the conventional fluid control apparatus 101 shown in FIG. 3 reveals the following. These two apparatus are identical with respect to the constructions and functions of the fluid control members 7, 8, 9, 10, 26 at the upper level. The conventional apparatus has nine members 11, 12, 13, 14, 52, 53, 55, 56, 28 for providing the couplings at the lower level, whereas the apparatus of the invention has a reduced number of members, i.e., six coupling members 11, 12, 14, 51, 54, 28 at the lower level. The apparatus of the invention need not have the four seals conventionally arranged at the portions of communication between the lower coupling members 11, 12, 13, 52, 53, 55, 56.

The preferred method of fabricating the coupling members 12, 51, 54 having the respective U-shaped channels 12a, 51a, 54a will be described below with reference to the fourth coupling 51.

Figure 2A:
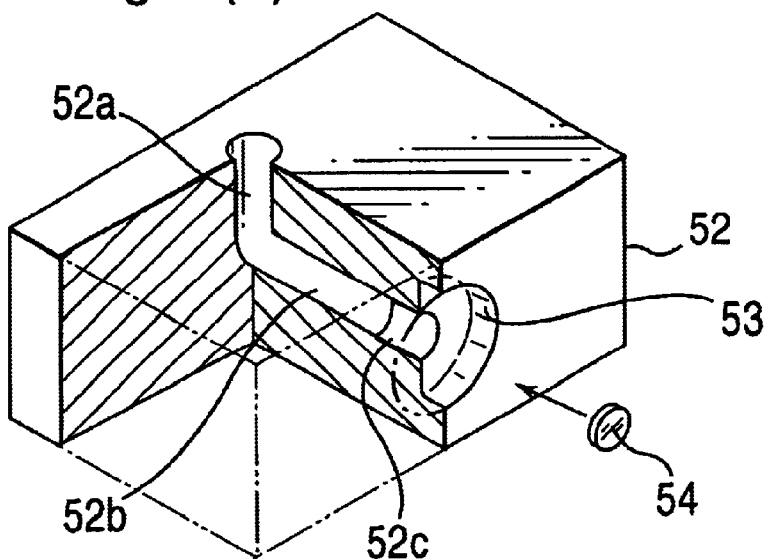
FIGS. 2(a), 2(b), 2(c) and 2(d) are views showing a method of fabricating the coupling member of the invention.
Figure 2B:
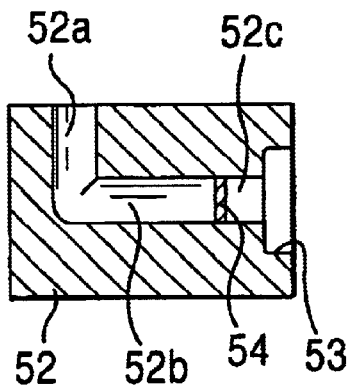
Figure 2C:
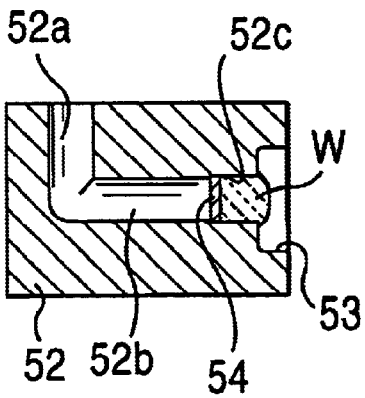
Figure 2D:
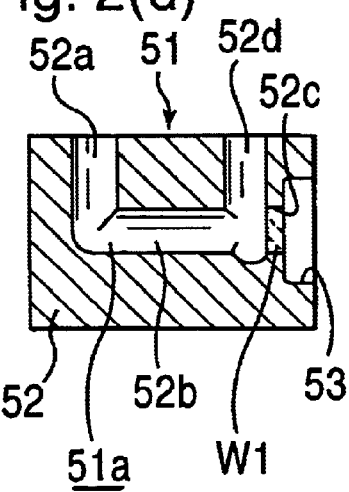

As shown in FIG. 2(a) and FIG. 2(b), a body block 52 is bored in the first step in the upper side thereof to form an upwardly open left passageway 52a and also in its right side to form an auxiliary passageway 52c and a communication passageway 52b in communication with the lower end of the passageway 52a. An opening 53 of large diameter is formed in the right side surface of the body 52 to facilitate to subsequent step. In this first step, the left passageway 52a, or the auxiliary and communication passageways 52c, 52b may be formed first. A closure member 54 in the form of a thin disk is inserted into the auxiliary passageway 52c in the second step. The closure member 54 is positioned at least partly in the portion where an upwardly open right passageway 52d is to be formed, so as to be cut away when the right passageway 52d is formed. In the third step, the closure member 54 is welded to the inner peripheral portion of the body 52 defining the auxiliary passageway 52c. The weld W is so formed as to completely close the auxiliary passageway 52c except the opening portion 53 of large diameter as seen in FIG. 2(c) so as to eliminate the possibility of a fluid flowing into the auxiliary passageway 52c even if the closure member 54 is removed by cutting. In the fourth step, the above mentioned upwardly open right passageway 52d is bored in the body block 52 as seen in FIG. 2(d), whereby the closure member 54 and part of the weld W are cut away to form a coupling member 51 wherein the auxiliary passageway 52c is closed with the remainder W1 of the weld. Formed in the coupling member 51 in this way is a U-sbaped channel 51a which comprises the pair of upwardly open straight left and right passageways 52a, 52d in parallel to each other, and a straight communication passageway 52b placing the lower m& of the two passageways 52a, 52d in communication with each other. The coupling 51, thus fabricated, is unlikely to permit the fluid to collect in the auxiliary passageway 52c and therefore to give rise to the problem of impaired purity of the process gas when used in semiconductor manufacturing equipment, or the like, which requires a very high degree of cleanliness.

Although not shown, the first coupling 11 can be obtained from the body block 52 shown in FIG. 2 and as extended leftward, by forming in the extension an L-shaped channel 11a which comprises an upwardly open straight passageway and a laterally open straight passageway extending from the lower end of the passageway.

What is claimed is:

1. A coupling member for use in fluid control apparatus comprising a body block formed generally of parallelepiped shape with a U-shaped channel comprising a pair of mutually spaced, upwardly opening passageways defined by continuous uninterrupted surfaces, said upwardly opening passageways being placed in mutual communication with each other solely by a communication passageway extending between lower ends of the upwardly opening passageways, and an auxiliary passageway extending from the lower end of one of the upwardly opening passageways and opening at a side of said body block as an extension of the communication passageway in alignment therewith, and a weld inserted into the auxiliary passageway closing the auxiliary passageway between said lower end of said one upwardly opening passageway and said side of said body block preventing fluid from flowing into the auxiliary passageway.

2. A method of fabricating a coupling member for use in fluid control apparatus comprising a body block formed with a U-shaped channel including a pair of upwardly open opposite passageways parallel to each other and a communication passageway holding lower ends of the opposite passageways in communication with each other therethrough, and a closed auxiliary passageway extending from the lower end of one of the opposite passageways as an extension of the communication passageway in alignment therewith, comprising the steps of: first, boring one of said upwardly opening passageways, a communication passageway and an auxiliary passageway in said body block; next, inserting a closure member into the auxiliary passageway; then welding the closure member to an inner peripheral portion of the body block defining the auxiliary passageway; and thereafter boring the other upwardly open passageway in the body block, the closure member being inserted in the auxiliary passageway so as to be positioned at least partly in the portion where the other upwardly open passageway is to be formed.

3. A coupling member for use in fluid control apparatus according to claim 1 wherein the auxiliary passageway has an opening of large diameter;

and means blocking communication of said opening of large diameter from said auxiliary passageway.

* * * * *